US005673543A

United States Patent [19]
Richardson et al.

[11] Patent Number: 5,673,543
[45] Date of Patent: Oct. 7, 1997

[54] FOLDABLE CORN HEAD WITH UNOBSTRUCTED AUGER

[75] Inventors: Mark David Richardson, LeRoy; Joel C. Stefl; James E. Glazier, both of Byron, all of N.Y.

[73] Assignee: Byron Enterprises, Inc. Byron, N.Y.

[21] Appl. No.: 582,687

[22] Filed: Jan. 4, 1996

[51] Int. Cl.$^6$ .............................. A01D 45/02; A01D 73/00
[52] U.S. Cl. .................. 56/85; 56/94; 56/97; 56/228
[58] Field of Search ............................. 56/51, 94, 95, 56/97, 83, 84, 85, 73, 228, 6

[56] References Cited

U.S. PATENT DOCUMENTS

| | | |
|---|---|---|
| 2,772,767 | 12/1956 | Seifert . |
| 3,115,738 | 12/1963 | Engler ............................. 56/6 |
| 3,540,195 | 11/1970 | van der Lely . |
| 4,300,333 | 11/1981 | Anderson . |
| 4,409,780 | 10/1983 | Beougher et al. ................ 56/228 |
| 4,530,429 | 7/1985 | Erickson . |
| 4,903,470 | 2/1990 | Hemker et al. . |

OTHER PUBLICATIONS

Sales brochures from: Fantini Bouchard Agriculture, Saint-Price, France. F.11i Cressoni s.p.a., Mantova, Italy; Case IH, Division Agricole de Case Poclain S.A., LePlessis-Belleville Cedex, France; and Pixall Corp., Clear Lake, Wisconsin.

*Primary Examiner*—Terry Lee Melius
*Assistant Examiner*—Heather Shackelford
*Attorney, Agent, or Firm*—M. Lukacher; K. Lukacher

[57] ABSTRACT

A foldable corn head having separable, matable auger sections which are cantilever suspended from the ends thereof to provide an obstruction-free path for harvested ears of corn being transported by the auger. Outer sections of the corn head are foldable vertically about horizontal hinges to reduce the width of the head for over-the-road travel. Stub auger sections are cantilever mounted from end plates in the pivotable outer corn head sections, at least one of the stub sections being driven by an actuator, such as a hydraulic motor means. The stub sections are provided with coupling elements at their inner ends which are matable with coupling elements in the ends of the main auger section. The elements have non-symmetrically disposed mating pins and bores to form the couplings and to align the ends of the helical auger flanges. In a preferred embodiment, the main auger section is supported and driven solely by coupling to the stub sections in harvesting position, and lies free in the trough when uncoupled in non-harvesting position. In a second embodiment, the main auger section is supported at its center by a strut and bearings and is cantilevered outward therefrom to mate with the cantilevered auger stub sections. In all embodiments, the auger flow path for the corn ears is free of auger support elements which can cause plugging of the auger and damage to corn ears, particularly ears of fresh corn for direct retail sale or processing.

20 Claims, 10 Drawing Sheets

FOLDABLE CORN HEAD WITH UNOBSTRUCTED AUGER

The present invention relates to ear corn harvesting apparatus known as a "corn head" for mounting on the forward part of a self-propelled vehicle, more particularly to corn heads having auger conveyors for collecting corn ears harvested simultaneously from a plurality of corn rows and conveying the ears laterally to a central region of the corn head, and most particularly to such corn heads which are adapted to be decreased in width to facilitate over-the-road travel of the vehicle by pivoting one or more portions of the corn head.

Corn harvesting heads are well known. Typically, harvesting apparatus is disposed on the front of a self-propelled tractor having a central, longitudinal conveyance system which carries ears from the corn head to a receiving vessel or vehicle. The harvesting apparatus typically comprises a pair of row separators which straddle a row and a pair of driven gathering belts and cutters which strip the ears from the stalks, discard the stalks, and convey the ears rearward to the tractor conveyor.

Commercially available corn heads are capable of harvesting a plurality of rows, up to eight or more, simultaneously by ganging side-by-side replicate row harvesting apparatus. Such machines are necessarily quite wide, up to five meters or more. A serious drawback is that their width makes road travel between cornfields difficult or impossible. In some areas, especially in Europe, such wide machines are not permitted on the roads. Accordingly, mechanisms have been devised by some corn head manufacturers to permit narrowing of their corn heads for over-the-road travel by pivoting upward and inward one or more of the outer harvesting sections so that in travel mode the corn head is no wider than the tractor bearing it. For example, foldable corn heads are available from Fantini Bouchard Agriculture, Saint-Brice, France; F.lli CRESSONI s.p.a., Mantova, Italy; CASE IH, Division Agricole de Case Poclain S.A., Le Piessis-Belleville Cedex, France; and Pixall Corp., Clear Lake, Wis.

A multiple-row corn head requires a mechanism to gather the ears from the plurality of harvesting heads and convey them to the center of the machine. Typically, a horizontal auger conveyor is disposed aft of the harvesting heads and transversely of the machine. A typical harvester auger conveyor is disclosed in U.S. Pat. No. 4,300,333 issued Nov. 17, 1981 to Anderson. The conveyor may consist of a driven auger in a partial trough, the auger having a helical flange attached to a central longitudinal tube which may contain a drive shaft or other drive elements. The left and right halves of the auger have opposite-sense helices, so a given rotational direction of the entire auger serves to urge ears from the left and right portions of the corn head to the center where the ears are discharged through an exit throat in the back of the head onto the longitudinal tractor conveyor. Augers for conveying corn or other grains are disclosed, for example, in U.S. Pat. Nos. 2,772,767 issued Dec. 4, 1956 to Seifert; 3,540,195 issued Nov. 17, 1970 to van der Lely; and 4,903,470 issued Feb. 27, 1990 to Hemker et al.

Folding the harvesting mechanism requires that the auger tube, flange, and trough be pivotably separable for transport and subsequently reattachable in driving/driven relationship for use. Known harvesters have brackets and bearings at the separation point in the auger to support and align one or both separated ends of the auger tube (see U.S. Pat. No. 4,530,429 issued Jul. 23, 1985 to Erickson; the Case IH Harvester Series 1100; the Fantini Bouchard harvester; and the Pixall harvester manufactured by Cressoni.) For separable augers which fold at the center, these brackets and bearings are innocuous. However, for augers which are foldable at a point in the conveyance path of the corn ears, the brackets and bearings can occlude a significant portion of the auger trough, preventing the smooth flow of corn ears along the trough. Under heavy load of ears, the auger can become jammed by the obstruction of the bracket to passage of the ears, resulting in damaged ears and potential failure of the equipment.

Much corn is harvested as dried shell corn for animal feed or industrial uses, wherein ear damage by the harvester can be unimportant. However, a large market also exists for mechanically-harvested fresh corn. Machines having obstructions in their augers can damage the delicate kernels of fresh corn ears, making those ears unacceptable for retail sale or as sources of cut corn for processing. Thus there is a need for a foldable multiple-row corn head having a separable auger conveyor without obstruction in the conveyance path of the corn ears.

It is a principal object of the invention to provide an improved foldable corn head having an auger in a conveyor with no auger suspension or mounting elements in the flow path of the corn ears.

It is a further object of the invention to provide an improved foldable corn head wherein all auger driving elements are contained in a pivotable portion of the head.

It is a still further object of the invention to provide an improved foldable corn head wherein the main auger section is suspended solely by couplings to stub auger sections cantilevered in one or more pivotable portions of the head.

It is a still further object of the invention to provide an improved foldable corn head wherein the main auger portion lies free in the trough when the head is in folded mode and is automatically reacquired, recentered, resuspended, and rotationally recoupled by the unfolding and reattachment action of the pivotable portions of the head.

Briefly described, a foldable multiple-row corn head embodying the invention has a plurality of side-by-side row harvesters which can include separators, cutters, gathering belts and other harvesting elements well known in the trade. At least one end of the corn head, preferably both ends, has a frame portion supporting a portion of the row harvesters and pivotable with respect to the fixed frame on a hinge having a substantially horizontal axis oriented substantially fore-and-aft of the machine in response to an hydraulic cylinder connected pivotably between the corn head fixed frame and a linkage attached to the pivotable frame. Preferably, the pivotable portion can be rotated through approximately 180° to place it in inverted position above the next inboard (first fixed) row harvester, thereby decreasing the transverse width of the corn head to facilitate movement of the apparatus over the road.

Transversely of the corn head in operating position is a horizontal auger conveyor comprising a trough containing an auger consisting of a tube provided with a helical flange. The left and right halves of the auger have opposite sense helices so that rotation of the auger in the trough causes ears deposited in the trough by the individual row harvesters to be urged toward the center of the trough for transfer to an additional conveyor exiting the machine. The trough, tube, and auger are matably separable. The stub trough on each pivotable end of the corn head is mounted on an outboard plate attached to the pivotable frame and thus is cantilevered in its extension inward of the plate. Likewise, the stub auger at each end is rotatably mounted in bearings at the outboard plate within the trough and thus is also cantilevered from the plate. The stub auger in at least one of the pivotable ends is coupled via conventional sprockets and chain to an hydraulic motor for driving the entire assembled auger in harvesting position.

At the inner end of each stub auger, the tube thereof contains a coupling portion, preferably female, having centering and locking elements for receiving male centering and locking elements disposed within the matable end of the main auger tube. The locking elements are asymmetrically disposed about the axis of the tube to permit locking to occur only when the ends of the fixed and pivotable helical flanges are properly aligned to form a continuous, unbroken flange across the coupling.

In a first embodiment, the main auger tube has no support other than the couplings just described. Since there is an operating clearance of preferably about one-half inch between the auger flange and the trough, the main auger, upon uncoupling of the foldable head portions, settles this distance into the trough. When unfolding the ends of the corn head and reassembling the auger for harvesting operation, to reacquire and recenter the main auger on the stub augers requires male and female centering cones having radii of more than one-half inch on the respective mating auger sections. In a second, presently preferred, coupling embodiment, a large female outer cone on the stub tube end reacquires a large male cone on the main tube end, positioning the tube portions for subsequent recentering by a smaller axial female cone within the end of the stub shaft.

In a second embodiment, the main auger tube is formed as two mirror-image halves rotatably supported on a plate at the center and cantilevered outward therefrom. Since corn ears are not required to cross the centerline of the apparatus, the obstruction-free feature of the auger in accordance with the present invention is maintained. Preferably, a central bearing strut fixed vertically to the corn head frame is provided with a bore therethrough. A figured idler shaft, for example, hexagonal or splined, is disposed symmetrically through the bore and is journalled in bearings mounted on the plate. Within the left and right halves of the main auger tube are one or more fixed spacers having axial bores adapted to receive the idler shaft which can be retained within the spacers by a pin or bolt. The halves of the main auger are thus cantilevered outward from the central bearing plate. In this configuration, the main auger does not settle into the trough upon decoupling of the ends. An axial tapered pin and socket within the auger tubes can suffice for realignment, providing thereby a smooth tube outer surface at the joint without the protrusion of an outer cone as described in the first embodiment.

The foregoing and other objects, features, and advantages of the invention, as well as presently preferred embodiments thereof, will become more apparent from a reading of the following description in connection with the accompanying drawings in which.

Figure 1:
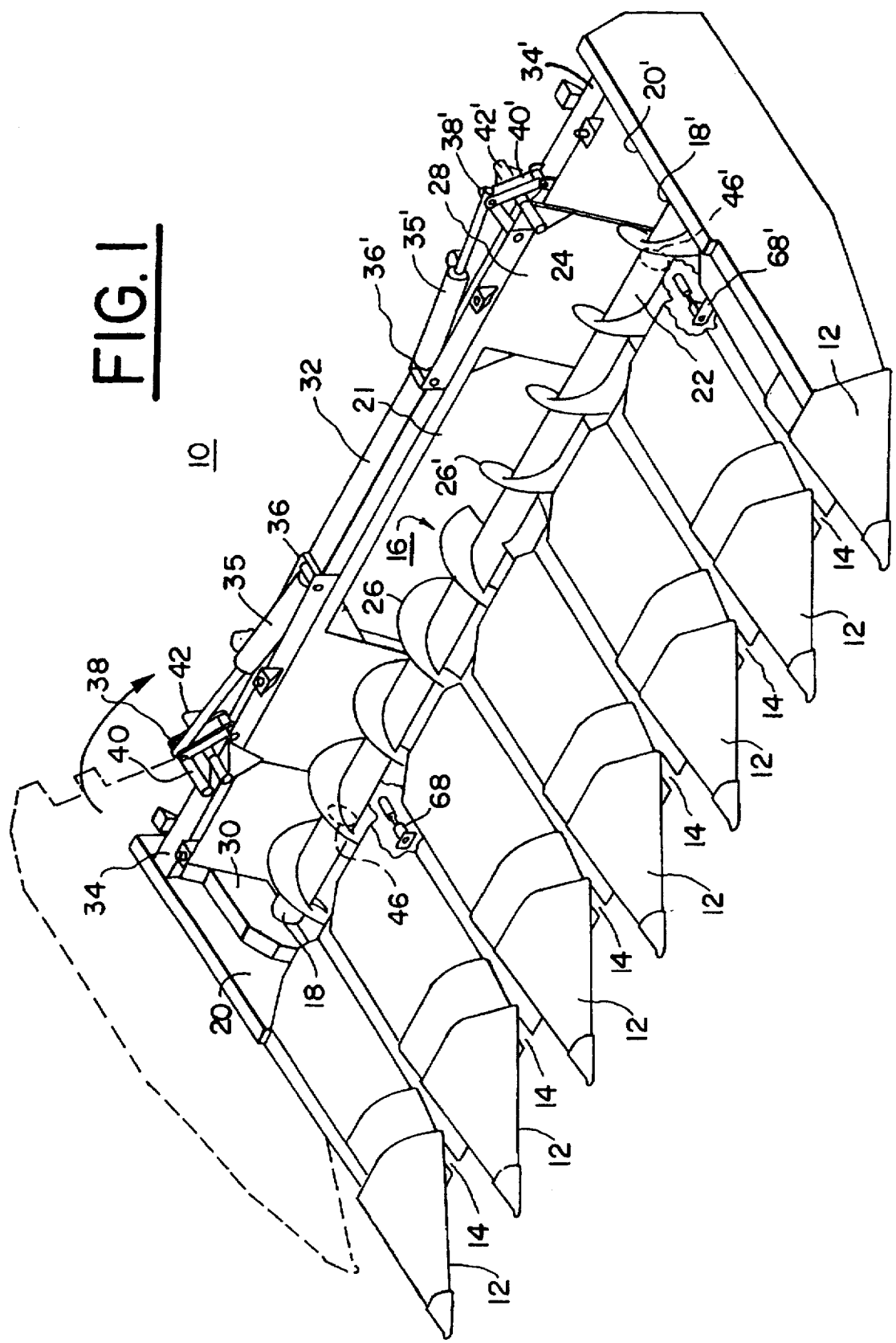
FIG. 1 is a perspective view of a foldable corn head in accordance with the invention.
Figure 2:
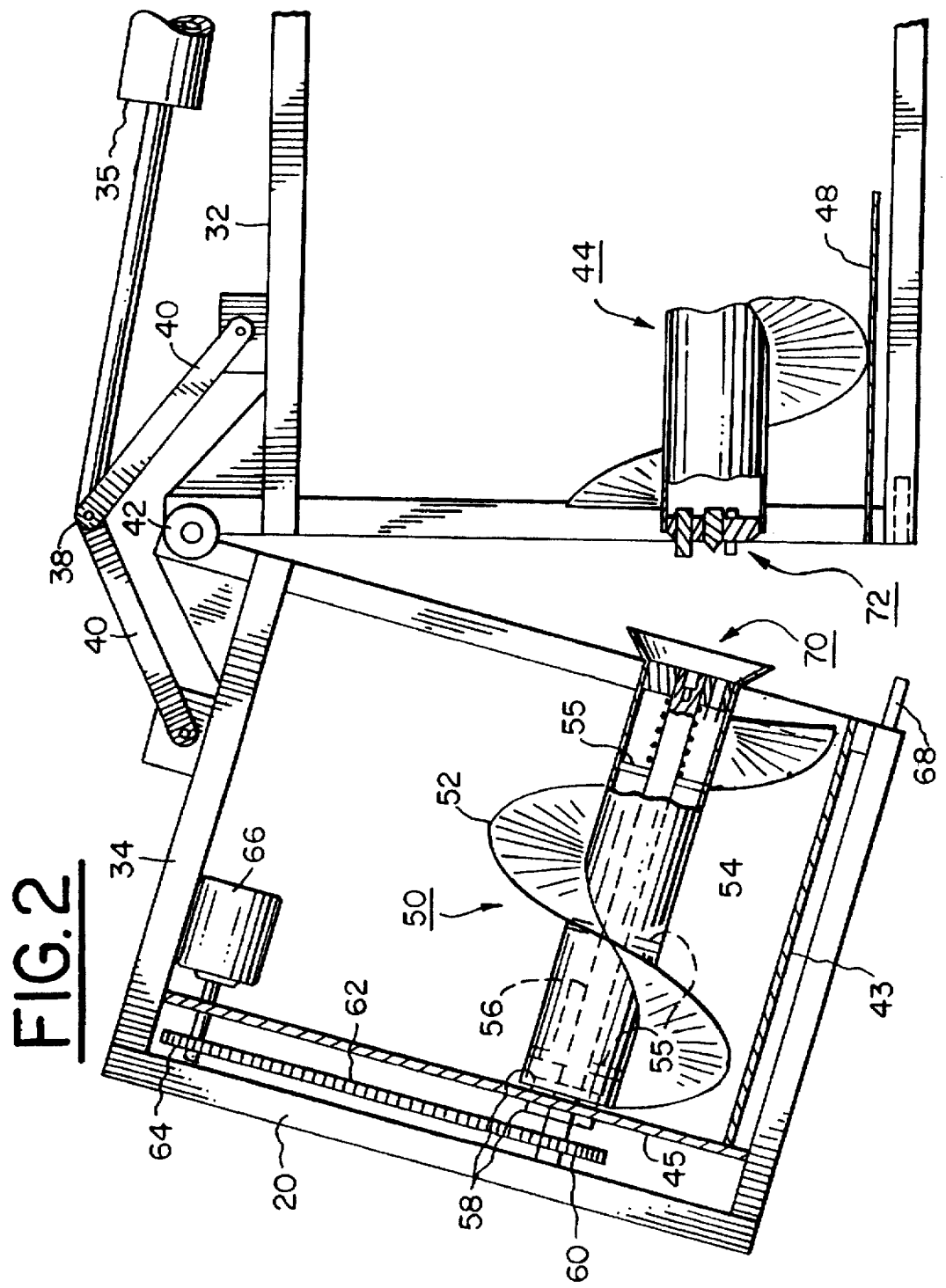
FIG. 2 is an elevational view, partially in cross-section, showing a foldable end of the corn head of FIG. 1 nearing reconnection of a folded portion into harvesting position, showing the stub auger section cantilevered on a shaft from the trough end plate.
Figure 3:
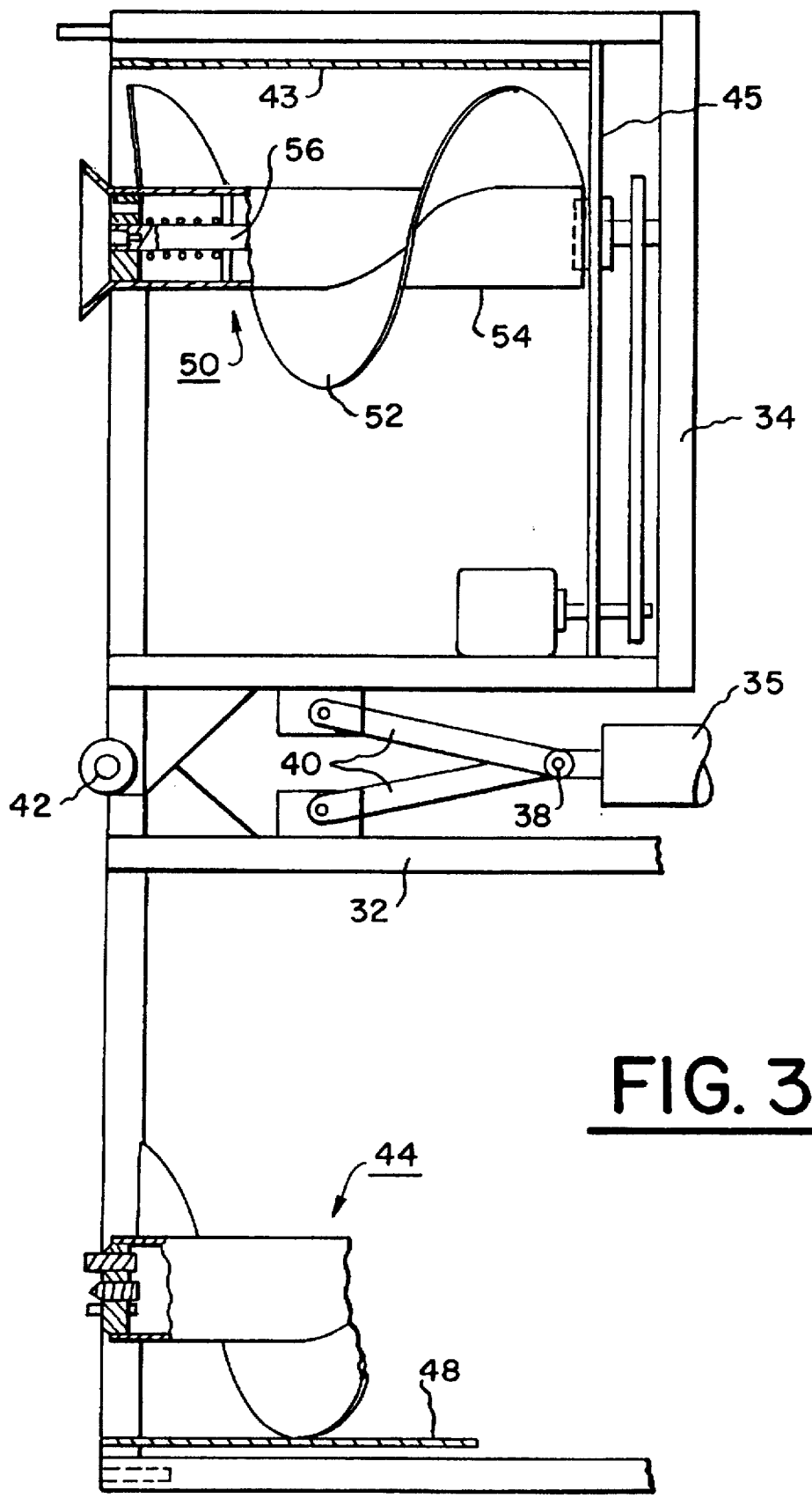
FIG. 3 is an elevational view like that of FIG. 2 showing the foldable end of the corn head in folded, or non-harvesting, position.

Referring to FIGS. 1, 2, and 3, a foldable corn head 10 has seven row separators 12 defining six substantially identical row harvesting mechanisms 14. The six row harvesters shown are arbitrary in number. Other pluralities of mechanisms are possible, for example, four, eight, and ten, limited only by the increasing size, weight, and complexity of the apparatus. The row harvesting mechanisms contain common mechanical elements well known in the art, but not shown here, necessary to cut a corn stalk from its base, feed the stalk through the machine, strip or cut corn ears from the stalk, convey the individual ears rearward, and discard the spent stalk material.

At the rear of the row harvesters and disposed transversely thereof is an auger conveyor 16 rotationally mounted at its ends 18 and 18' on end plates 20 and 20' to collect ears of corn from the plurality of row harvesters 14 and deliver them to an exit 21 at the rear of the corn head. Auger 22 includes a longitudinally central tube 24 supporting left-hand and right-hand progressing flights of helical flanges 26 and 26' to the left and right sides, respectively of the centerline of the corn head. A cylindrical trough 28, not fully visible in FIG. 1, extends beneath and parallel to, but spaced apart from, auger 22. Trough 28 is closed at its ends by end plates 20 and 20'. Auger 22 is rotationally driven by driving means (not shown) disposed in drive case 30. Behind auger 22 and trough 28 is a fixed frame 32 for supporting the auger drive mechanism and the trough, and for facilitating mounting the corn head on a self-propelled vehicle such as a tractor (not shown). Alternatively, the trough and end plates may be fabricated as the principal structural members of the corn head, and a separate frame may not be required.

Corn head 10 is foldable to a narrower configuration to facilitate being transported over the road while mounted on a tractor without requiring disassembly. One end, and preferably both ends, may be foldable in accordance with the invention. Outer frame portions 34 and 34' of fixed frame 32 each support an outer row separator and one half of a row harvester at opposite transverse ends of the corn head. Actuation means in the form of, for example, hydraulic cylinders 35 and 35' are pivotably attached at inner ends 36 and 36' thereof to fixed frame 32, and at outer ends 38 and 38' thereof to bridging linkages 40 and 40' over hinges 42 and 42' having pivot axes substantially horizontal. Contraction of cylinders 35 and 35' pivots the pivotable outer frames on the hinges, preferably through an angle of at least 180°, to an inverted non-harvesting position for road travel in which the outer harvesting mechanisms on the pivotable frames are inverted and above the harvesting mechanisms mounted on fixed frame 32 or trough 28 (FIG. 3). Extension of cylinders 34 and 34' reverses the action of contraction and reforms the corn head to harvesting position.

Folding of the corn head requires separation and subsequent re-attachment of all transverse elements in the corn head, including the shaft driving the harvesting elements of the row harvesters, the trough, and the auger tube. Schemes for separating and re-coupling the drive shaft and trough are well known in the art, as exemplified in the corn heads cited hereinabove, and are not detailed further herein. As noted previously, however, a scheme for supporting the auger without requiring external supports along the flow path of the corn ears as disclosed and claimed herein has not heretofore been advanced.

In FIGS. 2 and 3, main auger section 44 is a section of auger 22 shown in FIG. 1 between circles 46 and 46', and main trough section 48 is a section of trough 28. Pivotable frame 34 contains a trough section 43 terminated and supported by an end plate 45 attached to frame 34, and a stub auger section 50 which is also a section of auger 22. Auger 50 includes a helical flange 52 and a central hollow tube 54 containing a plurality of internal spacers 55. A stub shaft 56 extends through end plate 45 and is rotatably and inflexibly journalled in bearings 58 mounted on plate 45. At the outer end thereof, stub shaft 56 is adapted to be driven by a sprocket 60 connected by an endless chain 62 to a drive sprocket 64 turned by, preferably, a hydraulic motor 66. Auger section 50 is cantilever mounted on shaft 56 which extends therethrough and is fixed as by pins or keys to auger 50. A latch mechanism 68 of known design, preferably including an electrical solenoid slug, can secure the pivotable portion of the corn head to the fixed portion thereof in harvesting position.

Figure 4:
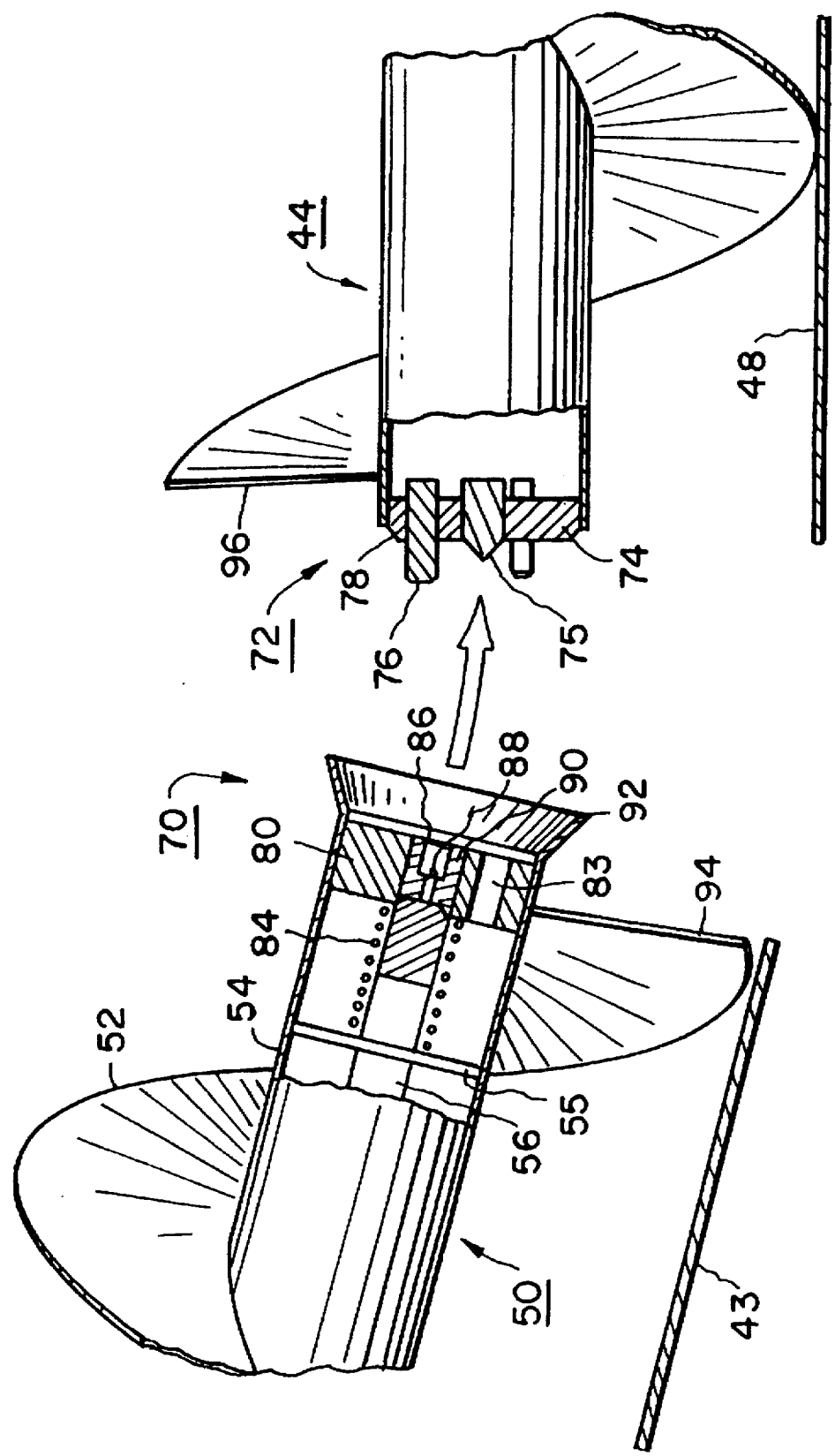
FIG. 4 is a detailed elevational view, partially in cross-section, of a first embodiment of the stub auger and main auger of one end of a separable auger conveyor nearing reconnection as in FIG. 2.
Figure 5:
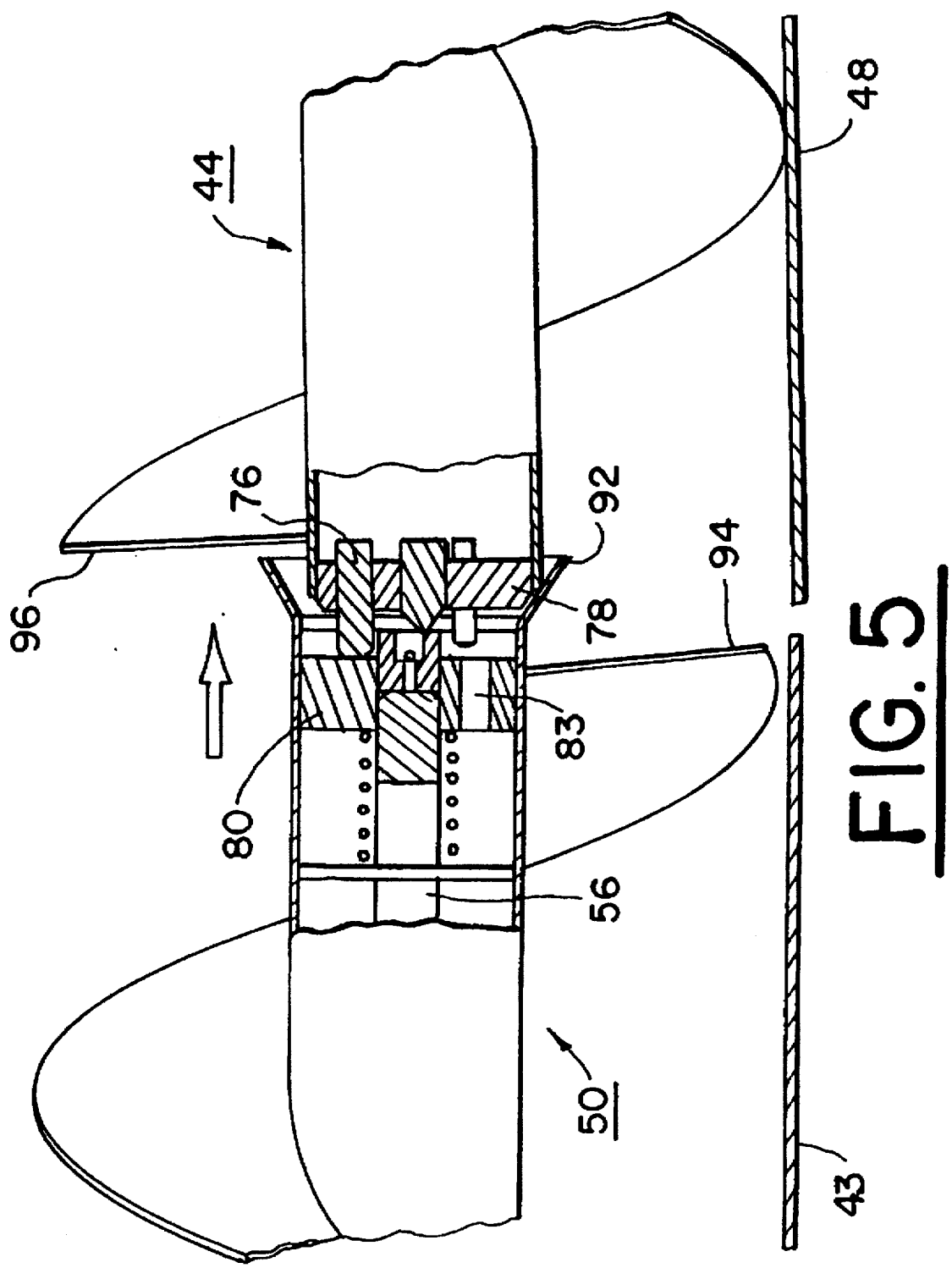
FIG. 5 shows the stub auger and main auger of FIG. 4 engaged on their outer acquisition cones but not yet rotationally coupled.
Figure 6:
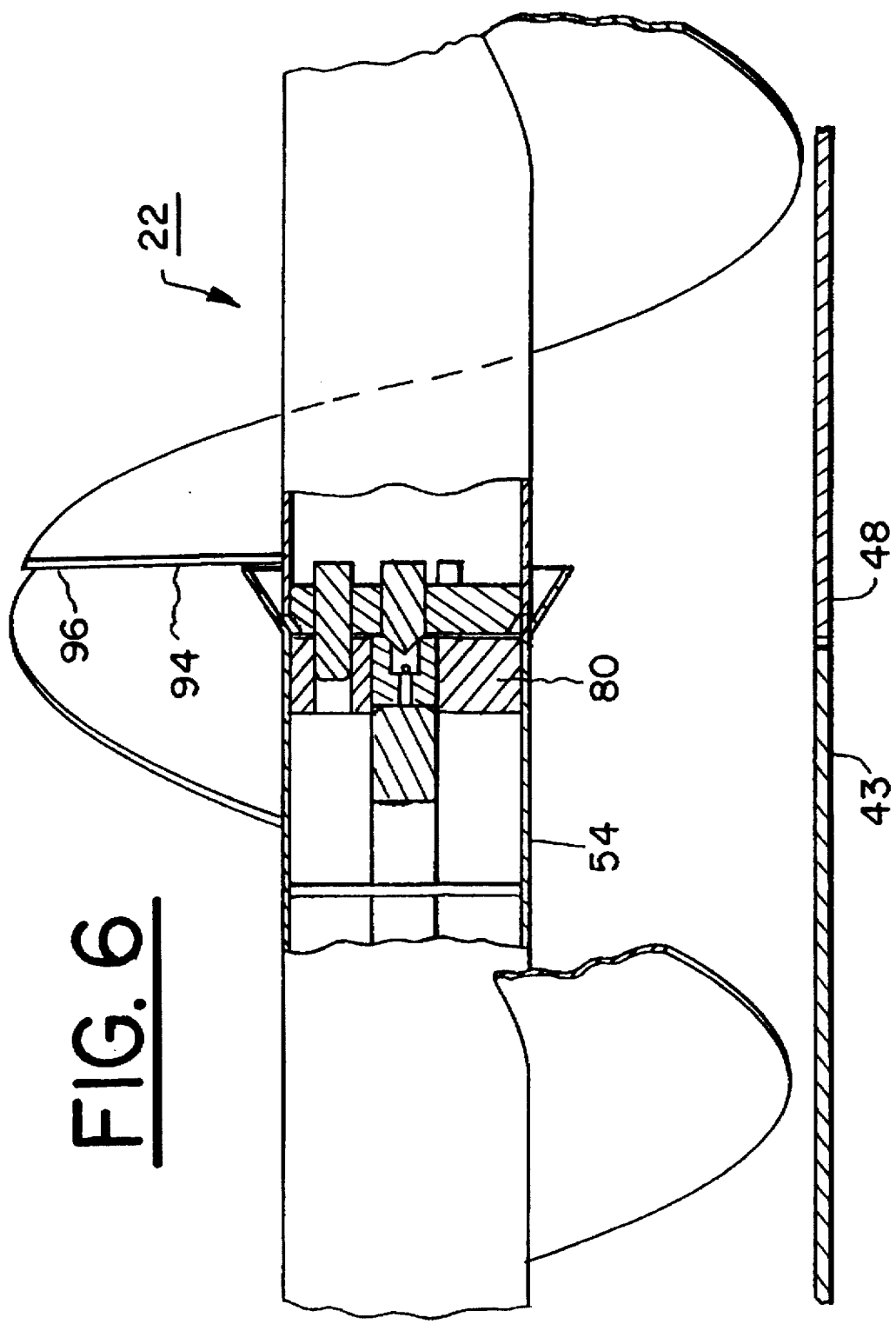
FIG. 6 shows the stub auger and main auger of FIGS. 4 and 5 centered on their inner cones and rotationally locked in harvesting position.
Figure 9:
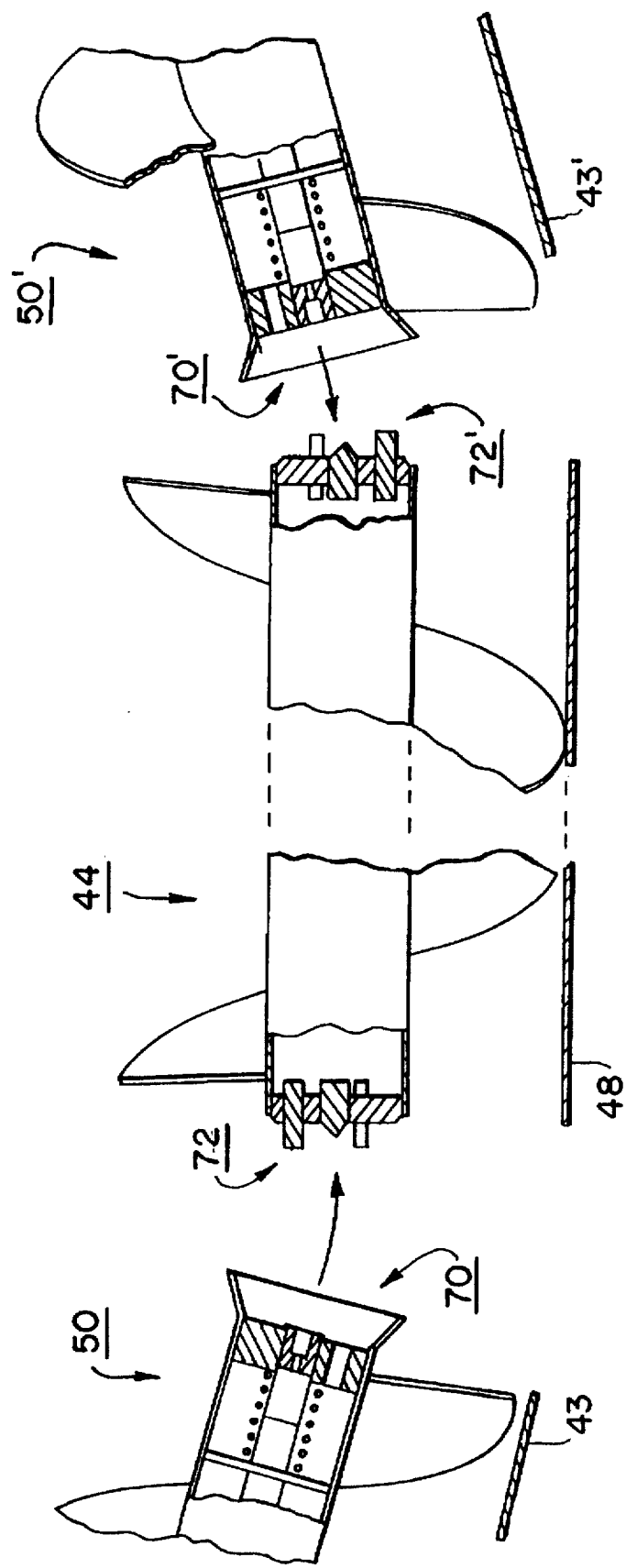
FIG. 9 is a view like that of FIG. 4 showing a second foldable portion of a trough and auger at an opposite end thereof from the first foldable portion.

At the intermediate ends 70 and 72 of auger sections 50 and 44, respectively, are coupling and locking means shown in detail in FIGS. 4 through 6. (A preferred embodiment having pivotable stub augers at both ends of the main auger section is shown in FIG. 9.) Within end 72 and fixedly mounted thereto is provided a first circular plate or disk 74 having coupling features including a male axial centering cone 75 and at least one non-axial pin 76. Preferably, three pins of differing diameters and/or lengths are triangularly disposed, preferably non-symmetrically, about cone 75 so that auger sections 50 and 44 can mate and lock to form auger 22 in only one relative rotational orientation between them, preferably so that the ends of the helical flanges on each section meet to form a continuous flange. Disk 74 projects slightly from the bore of section 44 and is provided with a chamfered periphery or male cone 78 to assist in re-connection of the auger sections as described hereinbelow.

Within end 70 of stub auger section 50 is a second circular plate or disk 80 slidably mounted on the figured inboard end of stub shaft 56. The end portion of the shaft is provided with a figured cross-section, for example a polygon such as a hexagon and preferably as splines, which is matable with a central aperture having the same figure in disk 80 so that disk 80 can slide freely on shaft 56 while being rotationally coupled to the shaft. Disk 80 is urged against a retaining clip 82 in section 50 by a backing spring 84. Disk 80 is provided with a plurality of non-axial bores 83, preferably three, matable with non-axial pins 76 in disk 74. The end face of stub shaft 56 is provided with a female centering cone 86 matable with male cone 75 to re-center the auger sections during re-connection thereof. Within cone 86 is a recessed grease nipple 88 by which lubrication may be provided via channel 90 for axial movement of disk 80 on shaft 56. End 70 is also provided with an outer female cone 92 matable with chamfered periphery 78 in re-connection of the auger sections.

In a first embodiment in accordance with the invention, main auger section 44 in harvesting position is supported solely at its ends by the coupling mechanism just described and a mirror-image mechanism at the opposite end thereof. When the pivotable frames are disconnected at latch 68 and pivoted into non-harvesting position, the main auger section, being otherwise unsupported, drops into the trough a distance of preferably about one-half inch and lies there until subsequent reassembly of the trough. Thus, the re-connection pivoting of the frames engages first the outer cones 78 and 92 (FIG. 5). Further motion of the frame drives cone 78 into cone 92, lifting the end of the main auger section from the trough and engaging centering cones 75 and 86. Still further motion of the frame drives cone 75 fully into cone 86, aligning the auger sections axially but not rotationally. Pins 76 engage the face of slidable disk 80 and force it axially along shaft 56 against spring 84. When hydraulic motor 66 is energized, disk 80 is turned until the non-symmetric pattern of pins 76 matches the pattern of bores 83 allowing disks 74 and 80 to rotationally couple, rotationally aligning the intermediate ends 94 and 96 of the stub and main auger helices, respectively (FIG. 6).

Figure 7:
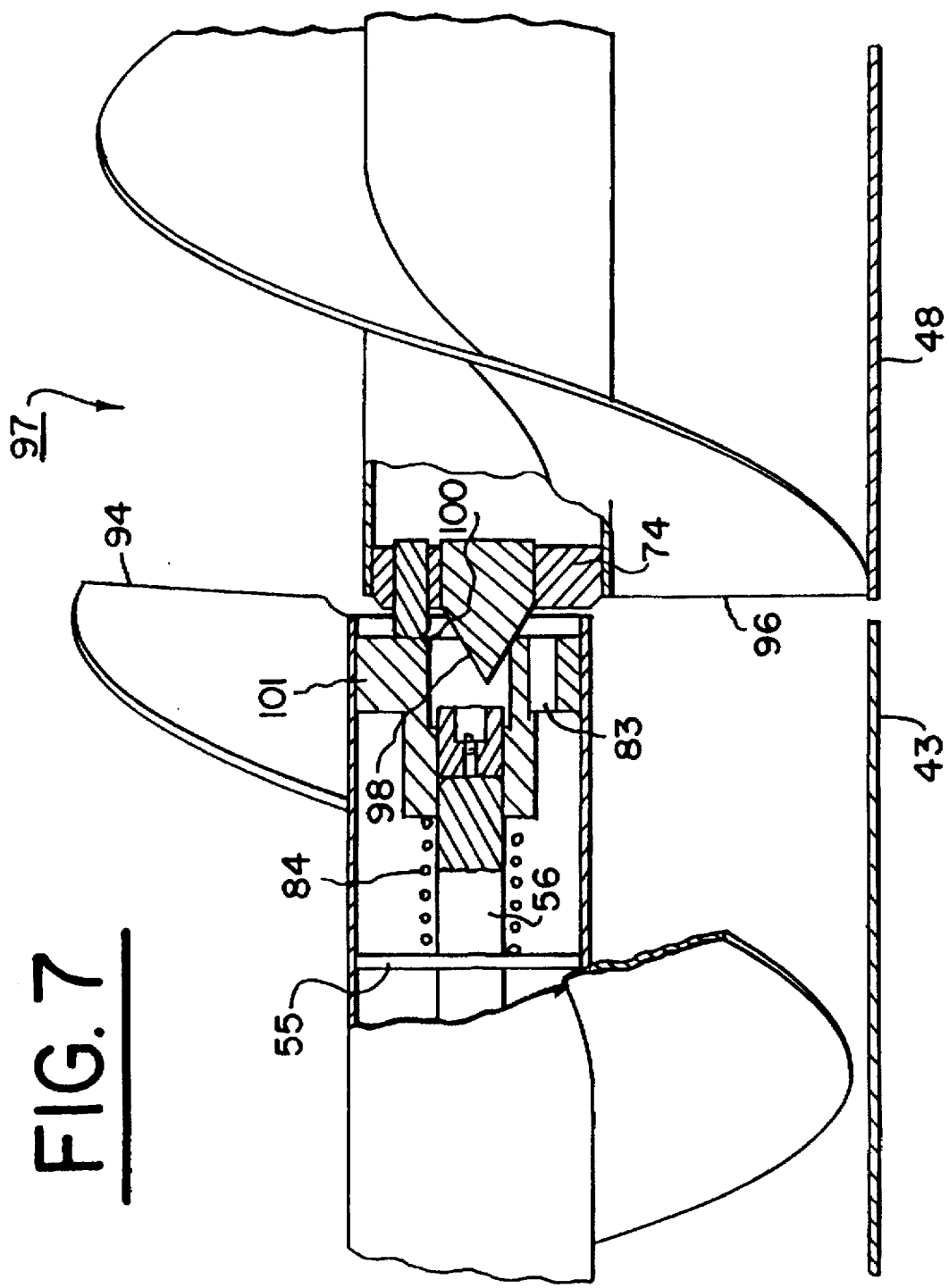
FIG. 7 is an elevational view, partially in cross-section, of a second embodiment of centering and locking apparatus for a stub auger and a main auger in accordance with the invention, showing the centering cones engaged.
Figure 8:
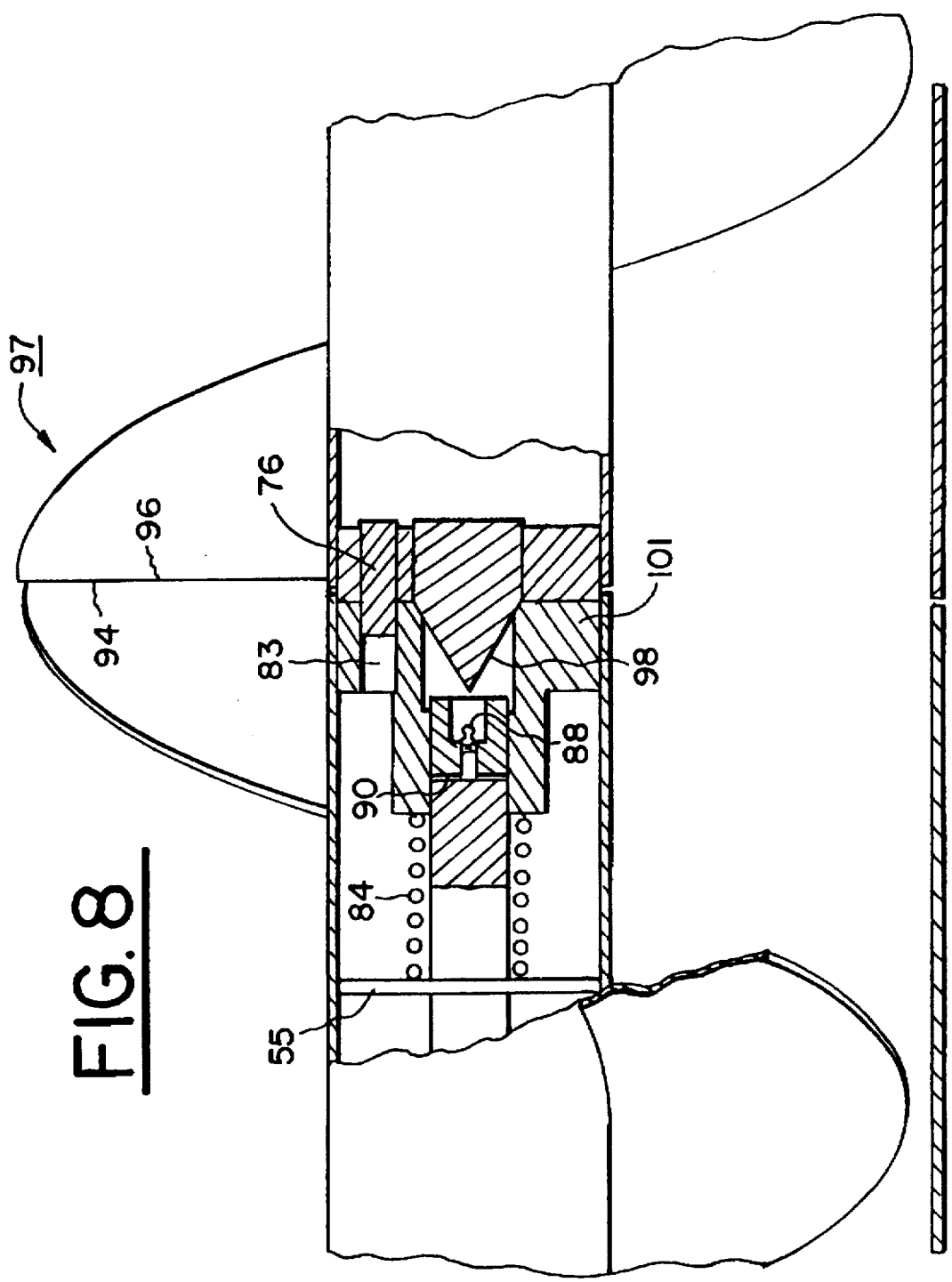
FIG. 8 is a view like that of FIG. 7, showing the augers having rotated to permit rotational locking of the coupling members.

In an alternative embodiment 97 of the coupling features, shown in FIGS. 7 and 8, a single large male cone 98 in disk 74 cooperates with a single large female cone 100 in a slidable disk 101 similar to disk 80 to engage and lift main auger section 44, and to axially align the auger sections. This embodiment provides a continuous auger tube in harvesting position without a female cone projecting above the surface of the tube as in the first embodiment.

In all of the herein described matable elements, the choice of location for male and female features is arbitrary and in general may be reversed at the will of the designer.

Figure 10:
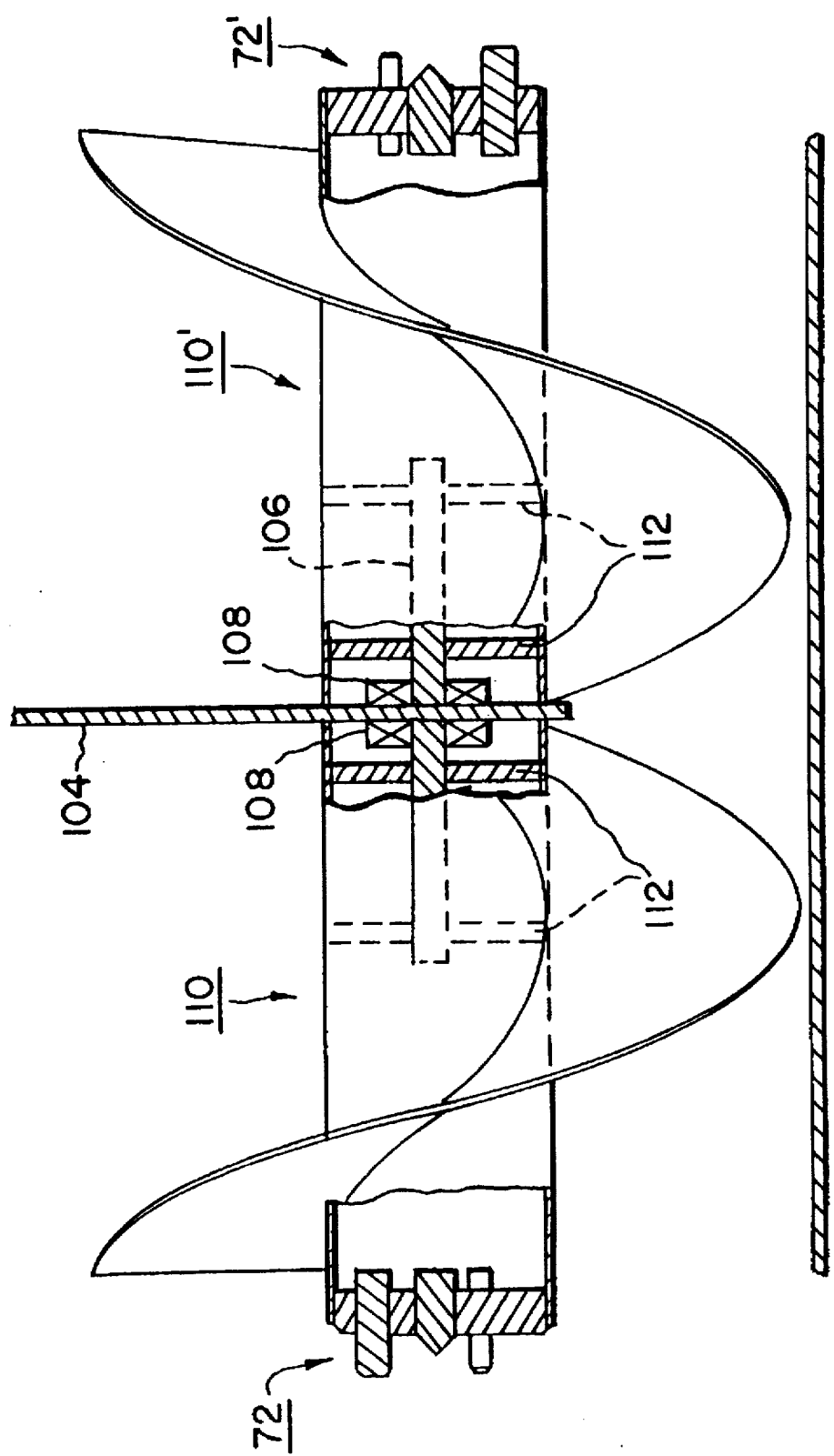
FIG. 10 is an elevational view, partially in cross-section, of a second embodiment of a main auger in accordance with the invention, showing the main auger cantilevered on a bearing-mounted idler shaft in a hanging strut.

In some applications, the main auger section may be too heavy to be readily lifted by centering cones in either of the coupling embodiments as described hereinabove. It may be preferable to provide a fixed support to the main auger section to prevent its descent into the trough at decoupling. This may be done within the scope of the invention by providing support means at the center of the main auger section at exit 21. Since corn ears are not required to travel past the centerpoint of the auger, a completely obstruction-free path for the ears is still provided. In FIG. 10, a strut 104 attachable to frame 32 or other mounting element extends downward therefrom. A main auger idler stub shaft 106 extends therethrough and is rotationally and inflexibly journalled in bearings 108. Left and right portions 110 and 110' of main auger section 44 contain internal spacers 112 having bores to accept shaft 106. The auger sections are rotationally fixed to the shaft as by pins or bolts (not shown).

From the foregoing description it will be apparent that there has been provided an improved foldable corn head for harvesting ears of corn, in particular fresh corn, wherein auger sections of an auger conveyor are suspended for rotation solely at points beyond the ends of the flow path of the ears. Variations and modifications of the herein described corn head, in accordance with the invention, will undoubtedly suggest themselves to those skilled in this art. Accordingly, the foregoing description should be taken as illustrative and not in a limiting sense.

What is claimed is:

1. A corn head mountable on conveyance means for harvesting ears of corn from a plurality of rows of corn simultaneously, said corn head being foldable and unfoldable between a harvesting configuration and a non-harvesting configuration, comprising:
  a) an articulated trough having a fixed portion mountable on said conveyance means and a first pivotable portion disposed to pivot on a first hinge from said fixed portion about a substantially horizontal axis outside said trough and substantially orthogonal thereto, said first pivotable trough portion being closed by a first plate at the outer end thereof;
  b) a plurality of row harvesters mounted on and directed forward from said trough, a portion of said row harvesters being mounted on said first pivotable trough portion, said trough being disposed behind said plurality of row harvesters and transversely thereof to accept and convey corn ears from said harvesters to an exit from said trough;
  c) an auger disposed in said trough to urge said corn ears in said trough toward said exit, means for rotating said auger, said auger including a longitudinal central tube and a helical flange attached to said tube, said auger having at least first and second longitudinal sections joinable and separable by first coupling means at intermediate ends thereof, the distal end of said first auger section being rotatably and inflexibly supported solely by a cantilever mechanism from said first plate within said first pivotable portion of said trough and being connected to said means for rotating said auger; and
  d) a driver for pivoting said articulated trough on said hinge between said harvesting configuration, wherein said portion of row harvesters is in operational orientation and said intermediate ends of said first and second auger sections are coupled, and said non-harvesting configuration, wherein said portion of row harvesters is substantially inverted and said first and second auger sections are separated.

2. A corn head in accordance with claim 1 further comprising an articulated frame having fixed and articulated frame sections for supporting said articulated trough and facilitating mounting of said trough on said conveyance means.

3. A corn head in accordance with claim 2 wherein said driver is an hydraulic piston pivotably mounted on said fixed frame section and connected to said pivotable frame section.

4. A corn head in accordance with claim 2 further comprising a shaft supported from said first end plate and extending axially within said auger tube for cantileveringly supporting said first auger section from said first end plate.

5. A corn head in accordance with claim 4 wherein a first end of said shaft is rotatably and inflexibly journalled in bearings mounted on said first trough end plate and extends through and is fixed to at least one spacer within and fixed to said first auger tube.

6. A corn head in accordance with claim 5 wherein said coupling means comprises:
  a) at least one female centering member on the intermediate end of one of said two auger sections;
  b) at least one male centering member on the intermediate end of the other of said two auger sections;
  c) a first coupling member having first coupling features and being axially movable within and rotatable with one of said auger tubes;
  d) a second coupling member having second coupling features matable with said first coupling features to rotatably lock said first and second coupling members, said second coupling member being axially fixed within and rotatable with the other of said auger tubes.

7. A corn head in accordance with claim 6 wherein said first coupling member is a first disk axially movable within and rotatable with said first auger tube, said first coupling features include at least one non-axial aperture in said first disk, said second coupling member is a second disk axially fixed within and rotatable with said second auger tube, and said second coupling features include at least one non-axial pin extending toward said first disk and being matable with said non-axial aperture in said first disk.

8. A corn head in accordance with claim 7 wherein the first and second coupling features are located on said first and second coupling members such that when said coupling members are in locked relationship the intermediate ends of said helical flange on said first and second auger sections meet to form a continuous helical flange.

9. A corn head in accordance with claim 7 further comprising a figured axial shaft supported within said first auger tube and extending through a figured axial aperture in said first disk, said first disk being thus disposed to slide axially on said figured shaft and to rotate with said shaft, and further comprising a backing spring within said tube to urge said first disk toward said second disk.

10. A corn head in accordance with claim 9 wherein a cross-sectional figure of said figured shaft and aperture is selected from the group consisting of splines and polygons.

11. A corn head in accordance with claim 1 wherein said conveyance means is a self-propelled vehicle.

12. A corn head in accordance with claim 1 wherein said means for rotating said auger includes a motor and chain drive.

13. A corn head in accordance with claim 1 further comprising:
  a) a second pivotable portion of trough at an opposite end of said fixed portion from said first pivotable portion and disposed to pivot on a second hinge from said fixed portion about a second substantially horizontal axis outside said trough, said second pivotable trough portion being closed by a second plate at the outer end thereof;
  b) a second portion of said row harvesters mounted on said second pivotable trough portion;
  c) a third auger section joinable and separable by second coupling means to said second auger section at intermediate ends thereof, the distal end of said third auger section being rotatably and inflexibly supported solely by cantilever from said second plate in said second pivotable portion of said trough; and
  d) a second actuator for pivoting said articulated trough on said second hinge between said harvesting configuration, wherein said second portion of row harvesters is in operational orientation and said intermediate ends of said second and third auger sections are coupled, and said non-harvesting configuration, wherein said second portion of row harvesters is substantially inverted and said second and third auger sections are separated.

14. A corn head in accordance with claim 13 further comprising a second shaft supported from said second end plate and extending axially within said third auger tube for cantleveringly supporting said third auger section from said second end plate.

15. A corn head in accordance with claim 13 wherein said first and second coupling means couple and uncouple said first, second, and third auger sections in response to the action of said first and second actuators, respectively.

16. A corn head in accordance with claim 13 wherein said second auger section in said harvesting configuration is supported solely by said first and second coupling means to said first and third auger sections at the intermediate ends thereof, and in non-harvesting configuration is in contact with and supported solely by the trough.

17. A corn head in accordance with claim 13 wherein said second auger section is supported from said trough by supporting means generally at a midpoint thereof.

18. A corn head in accordance with claim 17 further comprising a strut having a bore and extending from said trough, and a shaft extending through and to either side of said bore and being journalled in bearings mounted on said strut, said shaft extending through and being fixed to supportive spacers within said second auger section tube to provide support to left and right portions of said second tube, which support is cantilevering of said left and right portions of said second auger section when said corn head is in said non-harvesting configuration.

19. A corn head in accordance with claim 18 wherein said right and left portions of said second auger tube have right-hand and left-hand progressions respectively of said helical flange.

20. A corn head in accordance with claim 1 wherein, respective of the centerline of the corn head, said auger has right-hand and left-hand progressions respectively of said helical flange.

* * * * *